United States Patent [19]

Edwards et al.

[11] Patent Number: 4,797,075
[45] Date of Patent: Jan. 10, 1989

[54] OVERSPEED PROTECTIVE GEAR BOX FOR A WELL PUMP

[75] Inventors: Wallace L. Edwards, Stockton, Mo.; Joel F. Jones, Claremore; Howard G. Thompson, Jr., Tulsa, both of Okla.

[73] Assignee: Hughes Tool Company, Houston, Tex.

[21] Appl. No.: 36,218

[22] Filed: Apr. 9, 1987

[51] Int. Cl.⁴ .................. F04C 5/00; F04C 15/00; F04C 2/107; F04B 49/02
[52] U.S. Cl. .................. 418/48; 418/181; 417/223; 188/185; 192/105 BA; 166/237
[58] Field of Search .................. 418/48, 181, 270; 188/184, 185, 82.77; 417/214, 223, 212; 192/104 B, 105 BA; 166/237; 175/113, 121, 195

[56] References Cited

U.S. PATENT DOCUMENTS

| | | | |
|---|---|---|---|
| 2,898,087 | 8/1959 | Clark | 418/48 X |
| 3,550,727 | 12/1970 | McCain | 188/82.9 |
| 4,017,217 | 4/1977 | Lamers | 417/223 X |
| 4,216,848 | 8/1980 | Shimodaira | 188/184 X |

Primary Examiner—John J. Vrablik
Assistant Examiner—Leonard P. Walnoha
Attorney, Agent, or Firm—James E. Bradley

[57] ABSTRACT

A progressing cavity well pump has an overspeed brake to protect the gear box during reverse rotation. A power source rotates an input shaft of the gear box, which through a right angle drive, drives a string of rods extending into the well to the progressing cavity pump. A centrifugal brake is mounted to the input shaft. If the pump locks up, the power source will impart energy to the rods by twisting them until the power source reaches its limit. When the rods start to unwind, the centrifugal brake will engage to dissipate energy and slow the speed of the reverse rotation.

2 Claims, 2 Drawing Sheets

OVERSPEED PROTECTIVE GEAR BOX FOR A WELL PUMP

BACKGROUND OF THE INVENTION

1. Field of the Invention

This invention relates in general to submersible rotary well pumps rotated by rods from a motor located at the surface, particularly progressing cavity well pumps, and a means for preventing excessively high speed reverse rotation should the pump lock up.

2. Description of the Prior Art

A progressing cavity well pump assembly includes an electrical motor located at the surface. The electrical motor rotates an input shaft of a gear box. The gear box reduces the rotational speed on an output shaft. The output shaft is connected to a string of rods that extend to a rotor located in the well. The rotor is rotated inside a stationarily mounted stator.

In case the level of fluid in the well dropped too much, the added friction of the rotor rotating inside the stator would generate excessive heat. Eventually, the rotor can seize and lock up inside the stator. The string rods may be up to or more than 4,000 feet in length, consequently, the electrical motor will continue applying torque to the rods, twisting them, to a considerable degree before the motor finally reaches its limit and stops rotating. Then, the energy stored in the rods due to the torque imposed will cause the rods to begin to unwind, rotating the motor in reverse. The high amount of energy can cause the speed to be so high so as to damage the drive components at the surface.

SUMMARY OF THE INVENTION

The well pump assembly has an overspeed brake to protect the gear box during reverse rotation. A centrifugal brake is mounted to the input shaft inside the housing of the gearbox. If the pump locks up, the motor will impart energy to the rods by twisting them until the motor reaches its limit. When the rods start to unwind, the centrifugal brake will engage to dissipate energy and slow the speed of the reverse rotation.

DESCRIPTION OF THE PREFERRED EMBODIMENT

Figure 1:
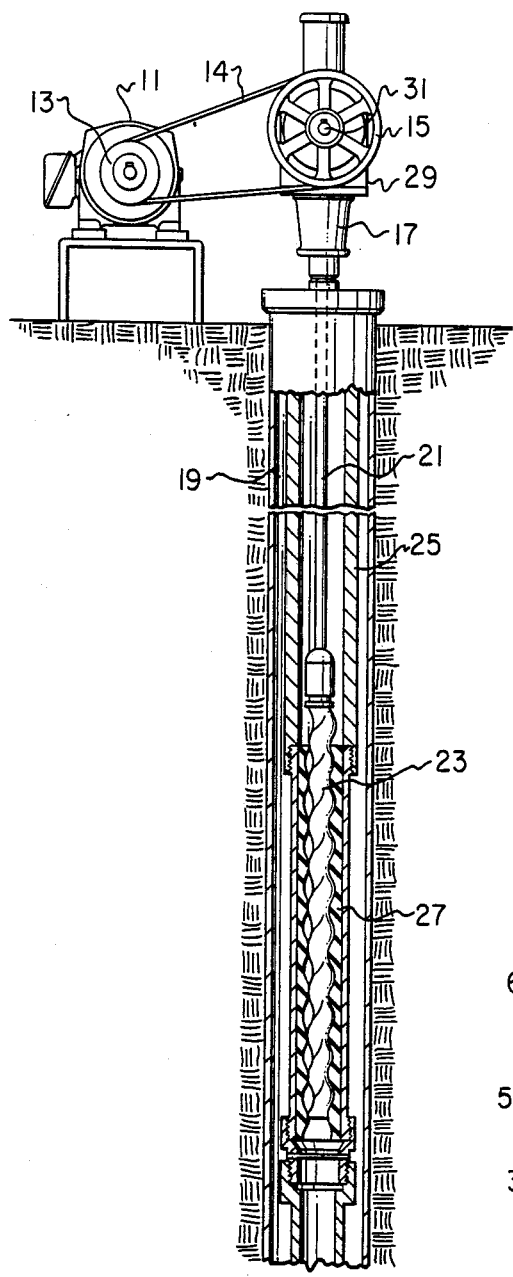
FIG. 1 is a schematic view illustrating a progressing cavity pump assembly.

Referring to FIG. 1, the pump assembly includes an electrical motor 11. Electrical motor 11 rotates a pulley 13, which in turn rotates a pulley 15 through a belt 14. Pulley 15 normally has a larger diameter than pulley 13. Pulley 15 is mounted to a right angle drive bear box 17.

Gear box 17 is mounted to the top of a well 19. The output from the gear box 17 is connected to a string of rods 21 that lead down into the well. A helical rotor 23 is mounted to the lower end of the rods 21 for rotation therewith. The rods 21 are carried inside a string of tubing 25 that leads to the surface. A stator 27 is mounted to the lower end of the tubing 25. Stator 27 has a multiple helix elastomeric interior which receives the rotor 23. This type of pump, also called a "Moineau" pump, results in fluid in the well being pumped through the stator 27 and through the tubing 25 to the surface.

Figure 3:
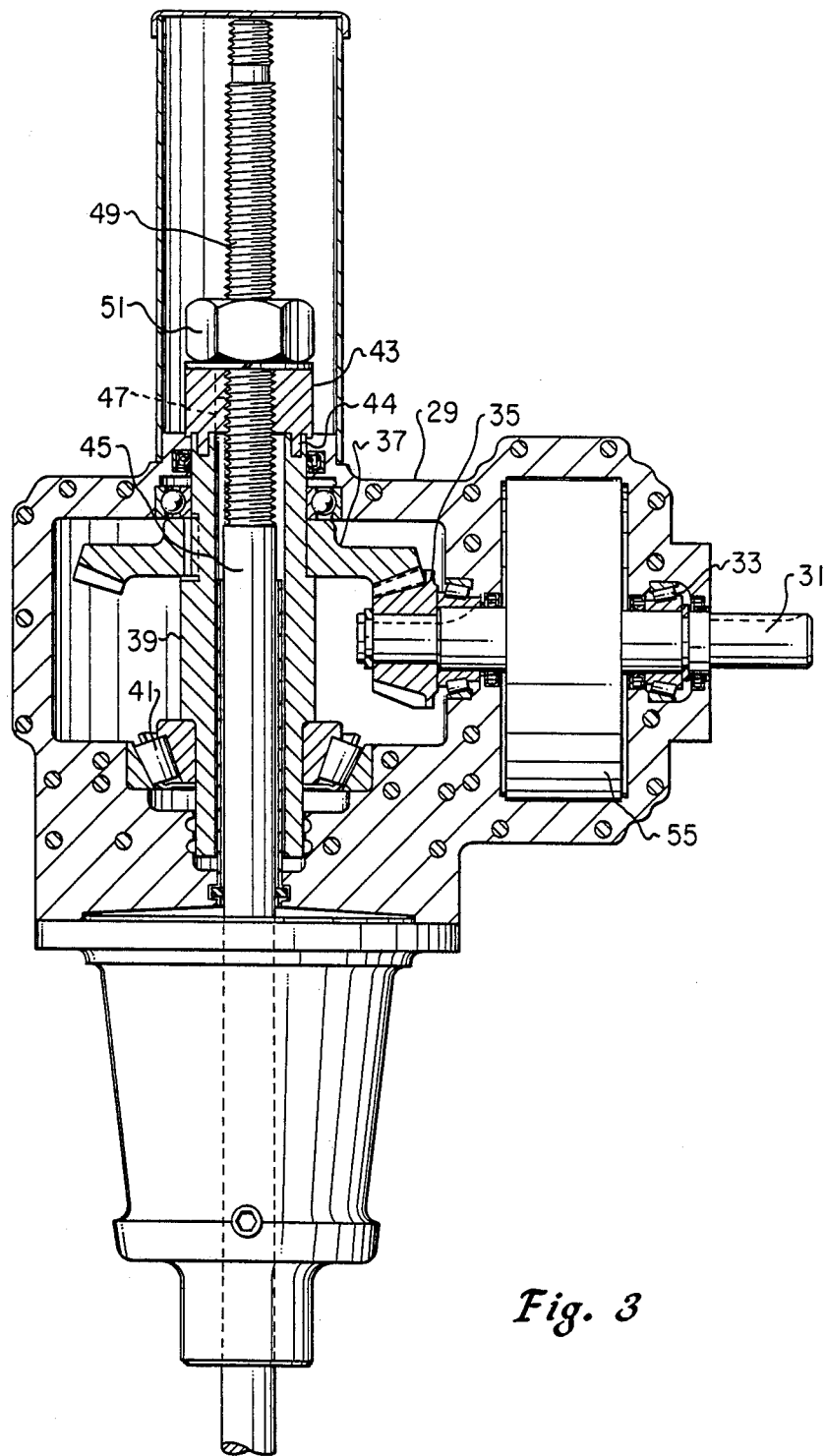
FIG. 3 is a partial vertical sectional view of the gear box for the progressing cavity pump assembly of FIG. 1.

Referring to FIG. 3, the gear box 17 has a housing 29. An input shaft 31 extends into the housing 29 horizontally. Input shaft 31 is mounted on bearings 33 and is connected on its inner end to a bevel gear 35. Gear 35 meshes with a bevel gear 37, which is of larger diameter than gear 35. Gear 37 is connected to a tubular output shaft 39 for rotation therewith. The output shaft 39 is vertical and at a right angle to the input shaft 31. The output shaft 39 is mounted on bearings 41. The gears 35 and 37 result in the output shaft 39 being rotated at one-third the speed of the input shaft 31.

A torque sleeve 43 is mounted to the top of the output shaft 39 for rotation. Torque sleeve 43 rotates with the output shaft 39 because of pins 44 interconnecting the output shaft 39 with the torque sleeve 43. A shaft 45 extends through the output shaft 39 coaxially. Shaft 45 is connected on its lower end to the rods 21 (FIG. 1). The shaft 45 rotates with the torque sleeve 43 by means of a key 47 located between the torque sleeve 43 and the shaft 45.

Threads 49 are located on the upper end of the shaft 45. The threads engage a nut 51. Nut 51 can be rotated to raise and lower the shaft 45, and thus the rotor 23 (FIG. 1) to properly position the rotor 23 in the stator 27.

Figure 2:
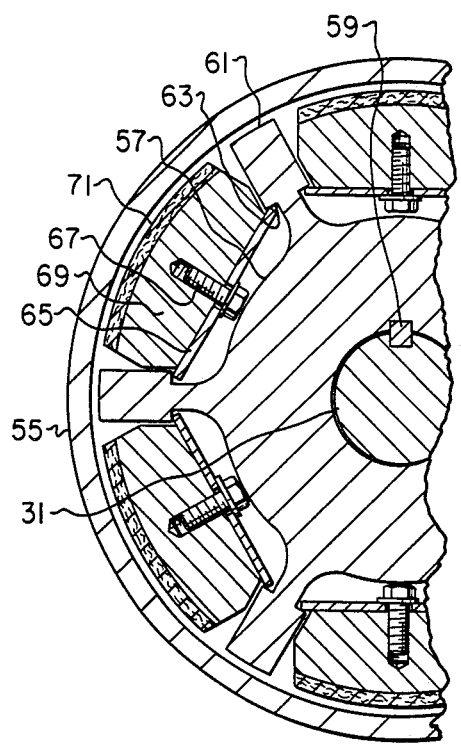
FIG. 2 is a cross-sectional view of a centrifugal brake to be used with the gear box of the pump assembly shown in FIG. 1.

A brake drum 55 is stationarily mounted in and to the housing 29. Brake drum 55 is cylindrical and has an axis that is coaxial with the input shaft 31. Referring to FIG. 2, a carrier 57 is located inside the brake drum 55. Carrier 57 is a plate that is secured to the input shaft 31 for rotation by means of a key 59. Carrier 57 has a plurality of fingers 61 extending radially outward toward the brake drum 55. Each finger 61 has an inwardly facing shoulder 63.

A leaf spring 65 is located between each pair of fingers 61. The edges of the leaf spring 65 locate under the shoulder 63 of each finger 61. A bolt 67 secures the leaf spring 65 to a brake shoe 69. Brake shoe 69 has an arcuate lining 71 on its exterior. Lining 71 is of a conventional brake band material that is wear resistant and applies friction when in contact with the brake drum 55. At rest and during normal operation, a clearance exists between the lining 71 and the interior of the brake drum 55. The interior of the brake drum 55 is sealed from lubricant contained in the housing 29.

In operation, motor 11 will rotate the pulley 15. The gear box 17 will translate the rotation to the drive rods 21. The drive rods 21 rotate the rotor 23 to pump fluid through the tubing 25 to the surface. Typical rotation speeds of rotor 23 are in the range from 100 to 500 rpm (rotations per minute).

If the fluid level in the well drops too much, additional heat will be generated between the rotor 23 and the stator 27 due to the friction. If the heat is sufficient to cause the rotor 23 to lock inside the stator 27, or if the rotor 23 locks inside the stator 27 for any reason, the motor 11 will continue to rotate for a short duration. This rotation will impart twist to the rods 21 until the capacity of the motor 11 causes it to stop. The stored energy in the rods 21 will then start to cause the rods 21 to unwind. The reverse rotation on the rods 21 rotates the shaft 44 (FIG. 3) in reverse. This results in the gear 37 rotating in reverse, and the input shaft 31 also rotating, at three times the speed of rotation of the rods 21. Pulley 15 (FIG. 1) will also begin to rotate in reverse.

The centrifugal force urges the brake shoes 69 outward, deflecting the leaf springs 69. Once the speed reaches a selected level, the leaf springs 65 will deflect sufficiently to allow the brake shoes 69 to bear against the drum 55. This selected speed is about 1600 rpm measured on the input shaft 31. The brake shoes 69 will create friction between the linings 71 and the brake drum 55 to slow the reverse speed and dissipate the energy stored. The brake shoes 69 will prevent the speed from exceeding the selected level. Once the energy in the rods 12 has dissipated such that the rotational speed has slowed below the point at which the brake shoes 69 engage the drum 55, the brake shoes 69 will move back to the normal position shown in FIG. 2, with a clearance between them and the brake drum 55.

The invention has significant advantages. The centrifugal brake prevents excessive speed which might occur due to unwinding of the drive rods. This reduces the chance for the drive pulleys to disintegrate. The centrifugal brake is located inside the housing so as to reduce the chances for tampering. The centrifugal brake allows complete unwinding of the rods to fully dissipate any energy stored in them due to locking up of the pump. Locating the brake at the input shaft, rather than the output shaft, reduces the size of the brake shoes required.

While the invention has been shown in only one of its forms, it should be apparent to those skilled in the art that it is not so limited, but is susceptible to various changes without departing from the scope of the invention.

We claim:

1. A progressing cavity well pump assembly, comprising in combination:

a power source;

a right angle gear box adapted to be mounted over the well, having a horizontally oriented input shaft adapted to be rotated by the power source and a vertically oriented output shaft adapted to be connected to a string of rods extending into the well, the gear box having gear means for rotating the output shaft at a lesser speed than the input shaft;

a stator having a helical elastomeric interior and adapted to be located stationarily in the well;

a helical rotor adapted to be connected to the lower end of the string of rods and rotatably carried in the stator for pumping fluid to the surface;

a carrier mounted to the input shaft for rotation therewith;

a cylindrical brake drum stationarily positioned around the carrier;

a plurality of brake shoes carried by the carrier and facing radially outward from the input shaft toward the brake drum; and spring means mounted between the carrier and the brake shoes for maintaining the brake shoes spaced from the drum during normal rotation of the input shaft, and for allowing the brake shoes to contact the drum should the speed of the input shaft exceed a selected level, to slow reverse rotation of the input shaft due to torque in the rods as a result of the rotor locking in the stator.

2. A progressing cavity well pump assembly, comprising in combination:

a power source;

a right angle gear box adapted to be mounted over the well, having a housing containing a horizontally oriented input shaft adapted to be rotated by the power source and a vertically oriented output shaft adapted to be connected to a string of rods extending into the well;

gear means in the housing for rotating the output shaft at a lower speed than the input shaft;

a stator having a helical elastomeric interior and adapted to be stationarily mounted in the well;

a helical rotor adapted to be carried out the lower end of the string of rods for rotation in the stator for pumping fluid to the surface;

a carrier mounted to the input shaft inside the housing for rotation therewith, the carrier having a plurality of spaced apart fingers protruding radially outward from the input shafts;

a cylindrical brake drum stationarily positioned in the housing around the carrier;

a plurality of brake shoes;

a leaf spring mounted to an inner side of each of the brake shoes, the leaf springs being secured at opposite edges to the spaced apart fingers to position each brake shoe between a pair of fingers and facing radially outward, the leaf springs maintaining the brake shoes spaced from the drum during normal rotation of the input shaft, and allowing the brake shoes to contact the drum should the speed of the input shaft exceed a selected maximum, to slow reverse rotation of the input shaft due to torque in the rods as a result of the rotor locking in the stator.

* * * * *

Notice of Adverse Decision in Interference

In Interference No. 102,240, involving Patent No. 4,797,075, W. L. Edwards, J. F. Jones, H. G. Thompson, Jr., OVERSPEED PROTECTIVE GEAR BOX FOR A WELL PUMP, final judgment adverse to the patentees was rendered Jan. 17, 1990, as to claims 1 and 2.
(*Official Gazette May 8, 1990*)